US006990602B1

(12) United States Patent
Skinner et al.

(10) Patent No.: US 6,990,602 B1
(45) Date of Patent: Jan. 24, 2006

(54) METHOD FOR DIAGNOSING HARDWARE CONFIGURATION IN A CLUSTERED SYSTEM

(75) Inventors: Steven George Skinner, Trabuco Canyon, CA (US); Donna Lynn Goodman, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 832 days.

(21) Appl. No.: 09/935,863

(22) Filed: Aug. 23, 2001

(51) Int. Cl.
*G06F 11/00* (2006.01)

(52) U.S. Cl. .............................. 714/4; 714/43; 714/13; 709/221; 709/223

(58) Field of Classification Search .................. 714/4, 714/43; 709/223, 224, 220, 221
See application file for complete search history.

(56) References Cited

U.S. PATENT DOCUMENTS

| | | | |
|---|---|---|---|
| 5,287,453 A | | 2/1994 | Roberts |
| 5,483,637 A | | 1/1996 | Winokur et al. |
| 5,822,531 A | * | 10/1998 | Gorczyca et al. ........... 709/221 |
| 5,966,510 A | | 10/1999 | Carbonneau et al. |
| 6,003,075 A | * | 12/1999 | Arendt et al. ............... 709/221 |
| 6,047,332 A | * | 4/2000 | Viswanathan et al. ...... 709/245 |
| 6,088,727 A | | 7/2000 | Hosokawa et al. |
| 6,360,331 B2 | * | 3/2002 | Vert et al. ...................... 714/4 |
| 6,467,050 B1 | * | 10/2002 | Keung .......................... 714/27 |
| 6,490,690 B1 | * | 12/2002 | Gusler et al. ................... 714/4 |
| 6,725,261 B1 | * | 4/2004 | Novaes et al. ............. 709/220 |
| 6,748,429 B1 | * | 6/2004 | Talluri et al. ............... 709/221 |
| 6,801,949 B1 | * | 10/2004 | Bruck et al. ................ 709/232 |
| 6,836,750 B2 | * | 12/2004 | Wong et al. ................ 702/186 |
| 2002/0198968 A1 | * | 12/2002 | Shirriff ....................... 709/220 |
| 2003/0028645 A1 | * | 2/2003 | Romagnoli ................. 709/226 |

* cited by examiner

*Primary Examiner*—Robert Beausoliel
*Assistant Examiner*—Philip Guyton
(74) *Attorney, Agent, or Firm*—Alfred W. Kozak; Mark T. Starr; Lise A. Rode

(57) ABSTRACT

The method of the present invention is useful in a computer system including at least two server nodes, each of which can execute clustered server software. The program executes a method for providing data to restore clustering when clustering services fail. The method includes the step of comparing current configuration data to previous configuration data. Next, the method compares the current configuration data to a standard configuration data. Finally, the method compares a set of operations to a standard clustering functionality.

13 Claims, 10 Drawing Sheets

FIG. 3 INITIALIZATION PHASE

INSTALLATION PHASE

DIAGNOSTICS PHASE

DIAGNOSTICS PHASE

DIAGNOSTICS PHASE

DIAGNOSTICS PHASE

DIAGNOSTICS PHASE

RESULTS PHASE

METHOD FOR DIAGNOSING HARDWARE CONFIGURATION IN A CLUSTERED SYSTEM

FIELD OF THE INVENTION

The present invention generally relates to the field of clustered computer systems and in particular to a method for providing the information necessary to restore clustering after the clustering service unexpectedly fails in a system consisting of two or more server nodes.

BACKGROUND OF THE INVENTION

A clustered system is a group of independent servers that run together as a single server for improved manageability, availability, and scalability. A clustered system requires two or more servers connected via a network. It requires a method for each server to access the other servers' data, and clustering software as utilized by the Microsoft Cluster Server (MSCS).

Clustering software provides the services necessary to manage the servers as a single system. When clustering software is running, events can happen that cause the clustered system to fail unexpectedly. These unexpected failures come in one of two forms.

One form of clustering software failure occurs when clustering between the two server nodes is no longer available. In other words, the two server nodes are no longer available to run together as a single server. Because the server nodes now lack this inter-cooperation, the two servers cannot function as a single clustered system.

The remaining second form of clustering software failure occurs when clustering has already been established. In this case, the two server nodes have already been set up as a clustered system. Although the two server nodes are clustered, an error can exist which does not allow the clustering software to perform properly.

After a cluster failure, a user of the clustered system does not know why the cluster failed. The user may not even know which of the two forms of clustering software failure occurred. Thus, the need arises to provide the user with information of how to restore clustering after experiencing a cluster service failure.

One prior art method to which the method of the present invention generally relates is described in U.S. Pat. No. 6,088,727 entitled CLUSTER CONTROLLING SYSTEM OPERATING ON A PLURALITY OF COMPUTERS IN A CLUSTER SYSTEM. The prior art method of clustering involves transferring packages that have been operating on one computer to another computer when a fault or failure has occurred by monitoring and controlling the packages in the entire system. When the respective packages are started-up, cluster daemons on the respective computers monitor and control resources on the operating computers. The monitored and controlled data are stored in the respective computers as local data. A manager communicates with cluster daemons on the respective computers, and stores data in a global data memory to monitor and control the entire system. The manager is actually one of the packages operating in the cluster system. If a fault or failure occurs in the manager or in the computer running the manager, the manager is re-started on another computer by a cluster daemon.

The present invention differs from the prior art in that the prior art method deals with the workings of the cluster software itself. The method of the present invention solves problems related to the workings of the underlying system to utilize such a cluster software package. The method of the present invention diagnoses the conditions required for the cluster software to operate and reports to the user what steps to take to remedy the situation.

Another prior art method to which the method of the present invention generally relates is detailed in U.S. Pat. No. 5,287,453 entitled FAST REMOTE FILE ACCESS FACILITY FOR DISTRIBUTING FILE ACCESS REQUESTS IN A CLOSELY COUPLED COMPUTER SYSTEM. This prior art is a cluster computer system that includes a plurality of independently operated computer systems located in close proximity to each other. Each system includes a system bus, a memory, and a set of local peripheral devices that connect in common to the system bus. The computer systems are interconnected for transferring messages to each other through the channels of a high-speed cluster controller that connect to the system buses. Each system further includes a cluster driver that transfers the messages between the memory of the computer system and the corresponding cluster controller channel when the system is configured to operate in a cluster mode of operation. User application programs issue monitor calls to access files contained on a peripheral device(s). The fast remote file access (FRFA) facility included in each system, upon detecting that the peripheral device is not locally attached, packages the monitor call and information identifying the user application into a message. The message is transferred through the cluster driver and cluster controller to the FRFA of the computer system to which the peripheral device attaches. The monitor call is executed and the response is sent back through the cluster controller and delivered to the user application in a manner so that the peripheral device of the other computer systems appears to be locally attached and the monitor call appears to be locally executed.

The present invention differs from the prior art in that the prior art deals with the fast remote file access facility to transfer information between computer systems that are clustered. The method of the present invention diagnoses the state of such facilities to communicate without specifying an underlying facility. The method of the present invention also recommends steps to remedy any problems with the facility.

Yet another prior art method to which the method of the present invention generally relates is detailed in U.S. Pat. No. 5,966,510 entitled SCSI-COUPLED MODULE FOR MONITORING AND CONTROLLING SCSI-COUPLED RAID BANK AND BANK ENVIRONMENT. The prior art method is an intelligent status monitoring, reporting and control module that is coupled to a SCSI bus that interconnects a cluster of SCSI-compatible data storage modules (e.g., magnetic disk drives). The status monitoring, reporting and control module is otherwise coupled to the cluster of SCSI-compatible data storage modules and to power maintenance and/or other maintenance subsystems of the cluster for monitoring and controlling states of the data storage modules and power maintenance and/or other maintenance subsystems that are not readily monitored or controlled directly by way of the SCSI bus. The status monitoring, reporting and control module sends status reports to a local or remote system supervisor and executes control commands supplied by the local or remote system supervisor. The status reports include reports about system temperature and power conditions. The executable commands include commands for regulating system temperature and power conditions.

The present invention differs from the prior art in that the prior art deals with the usage of a SCSI disk array to perform operations. The method of the present invention deals with the monitoring and reset operations on the SCSI bus itself to determine its operational status in regards to a clustering environment.

It is an object of the present invention to obtain server identification data from a server within a clustered system. Another object of the present invention is to obtain connection identification data from a server within a clustered system. Still another object of the present invention is to match different data fields between a server and a designated server within a clustered system.

Another object of the present invention is to compare storage usage between a server and another designated server within a clustered system. Another object of the present invention is to reset the SCSI bus on a server within a clustered system. Still another object of the present invention is to notify a user of the reasons why a failure occurred from clustering software. Still another object of the present invention is to synchronize tests in a hierarchy in order to give order to compatibility tests and resolve clustering software failures.

SUMMARY OF THE INVENTION

The method of the present invention is useful in a computer system including at least two server nodes, each of which can execute clustered server software. The program executes a method for providing data to restore clustering when clustering services fail. The method includes the step of comparing current configuration data to previous configuration data. Next, the method compares the current configuration data to a standard configuration data. Finally, the method compares a set of operations to a standard clustering functionality.

GLOSSARY OF RELEVANT ITEMS

Figure 1:
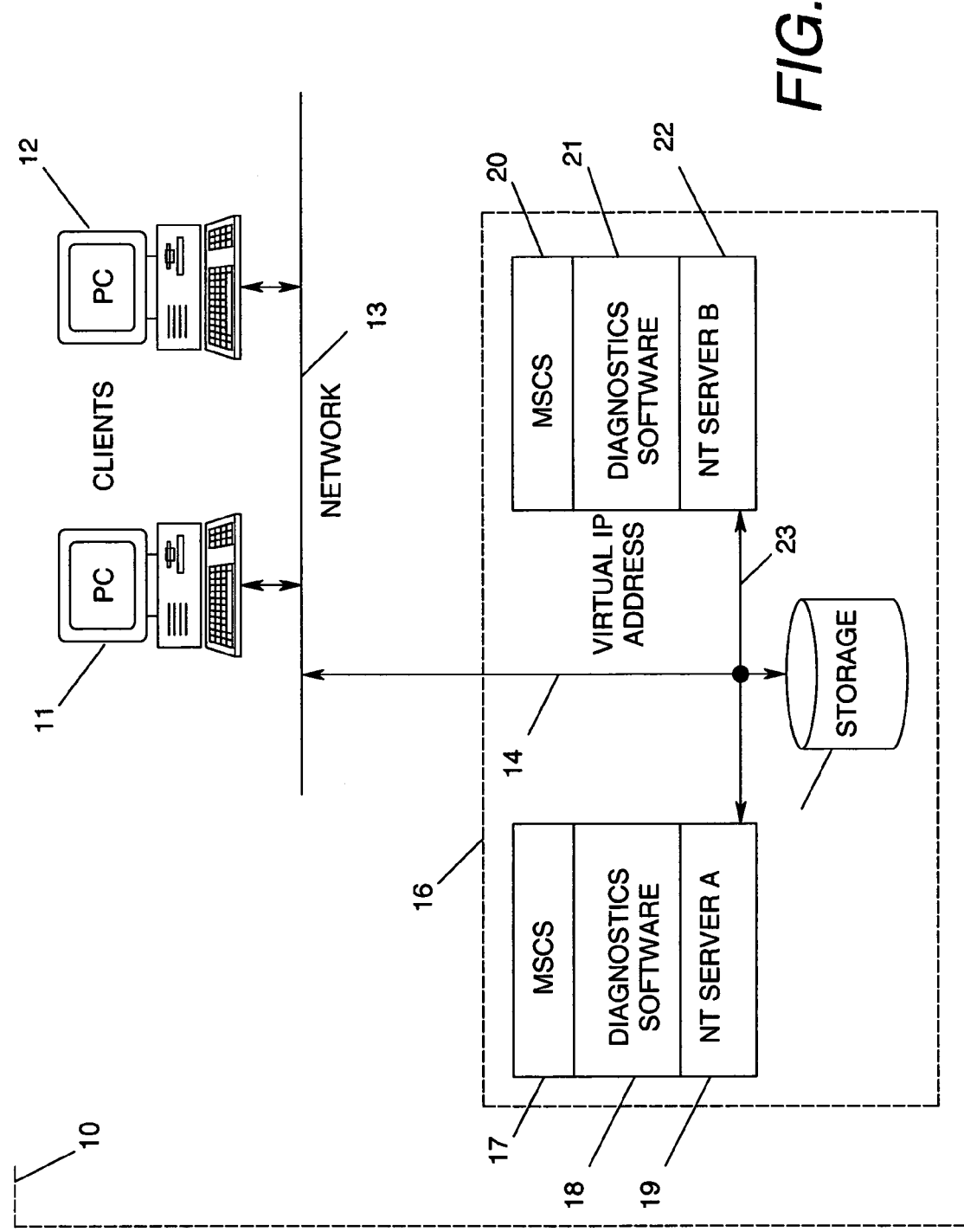
FIG. 1 is a generalized block diagram of a system that may use the method of the present invention.

MSCS: Microsoft Cluster Service. An implementation of a software clustering program.

NODE: A unit of a server able to run as an individual computer.

COMPANION NODE: Node within a cluster not being the one focused on for diagnostics.

CURRENT NODE: Node within a cluster focused on for diagnostics.

CONTROLLER NODE: Node associated with the cluster that provides a mechanism to identify the cluster to the LAN for communication purposes.

CLUSTER: One or more nodes sharing resources and serving as storage devices and communication connections that utilize a mechanism to dynamically redistribute these resources as needed.

PRIVATE NETWORK CONNECTION: Connection for a node used to communicate with other nodes within the cluster.

PUBLIC NETWORK CONNECTION: Connection for a node used to communicate with other servers found on the LAN but not necessarily within the cluster.

GUIDELINES FOR CLUSTERING: Each clustering software program will have requirements for the cluster to be able to work correctly. These requirements in the form of guidelines provide the basis for tests to be done. For example, MSCS has guidelines defined in the Cluster Support Knowledge Base.

SERVER: One or more nodes combined together within a single hardware implementation.

SHARED STORAGE UTILIZATION: Use of a device used to store data that is shared between two or more nodes.

STANDARD CONFIGURATION DATA: Data describing the setup of the node with respect to the information needed by the clustering software.

SCSI BUS: A communications bus within the node used to connect devices utilizing the SCSI standard.

VIRTUAL IP ADDRESS: An internet protocol address used for communications within the LAN not assigned to a particular piece of hardware, but utilized by software within the cluster to identify a member node of the cluster.

SET OF RESULTS (DISPLAY): Combination of messages generated during a diagnostic and the recommendations to remedy any exceptions noted.

TEST LEVEL: Level of interaction a test may impose on the operation of the cluster.

STORED DATA: Configuration data for the node saved to provide a temporal comparison to configuration data at another time.

CONFIGURATION DATA: Data describing the setup of the node with respect to the information needed by the clustering software.

CONFIGURATION DATA DISCREPANCY: Exception generated when comparing the configuration of the node to either the guidelines for clustering or the compatibility to other member nodes within the cluster.

INSTALLATION FORM: User interface to the program allowing the user to specify data to use in installing the clustering software and evaluating the data within the cluster.

DIAGNOSTICS FORM: User interface to the program allowing user to select operations to verify the cluster.

NETWORK CONNECTIONS: One or more connections of either the node, belonging to the cluster, or the cluster itself to the LAN.

LOG FILE: File used to store results of the verification operation in readable form.

ARBITRATION OPERATIONS: Operations used to determine the node controlling the operation of the cluster. This is done by communications between the nodes within the cluster and taking action when the communication fails.

SAVED CONFIGURATION: Configuration data for the cluster and individual node saved to provide for comparisons over time.

CURRENT STATE DATA: Data required to specify the state of the cluster as now derived from the current sources of information.

CURRENT CONFIGURATION DATA: Data required to verify the configuration of the cluster as now derived from the current sources of information.

GUIDELINES FOR CLUSTERING: Each clustering software program will have requirements for the cluster to be able to work correctly. These requirements in the form of guidelines to provide the basis for tests to be done. For example, MSCS has guidelines defined in the Cluster Support Knowledge Base.

PREVIOUSLY STORED DATA: Data required to verify the configuration of the cluster that was stored by either a previous execution of the program or earlier during this execution.

DETAILED DESCRIPTION OF PREFERRED EMBODIMENT

Referring now to the drawings and FIG. 1 in particular, a block diagram of a computer system is shown of a client-server network 10 including PC clients 11 and 12; and a clustered server 16 typically executing the Microsoft NT operating system. PC clients 11 and 12 are connected via a network 13 and interface with the clustered server 16 through a virtual IP address 14. The clustered server 16 contains two nodes designated NT Server A 19 and NT Server B 22. The NT Server A 19 is further comprised of a Microsoft Cluster Server (MSCS) software 17, which is available from Microsoft Corporation, Redmond, Wash., and a diagnostics software 18. The NT Server B 22 contains similar software, namely a MSCS 20, and a diagnostics software 21. The NT Server A 19 and the NT Server B 22 share a common storage device 15. This storage device is accessed through the SCSI bus 23.

Figure 2:
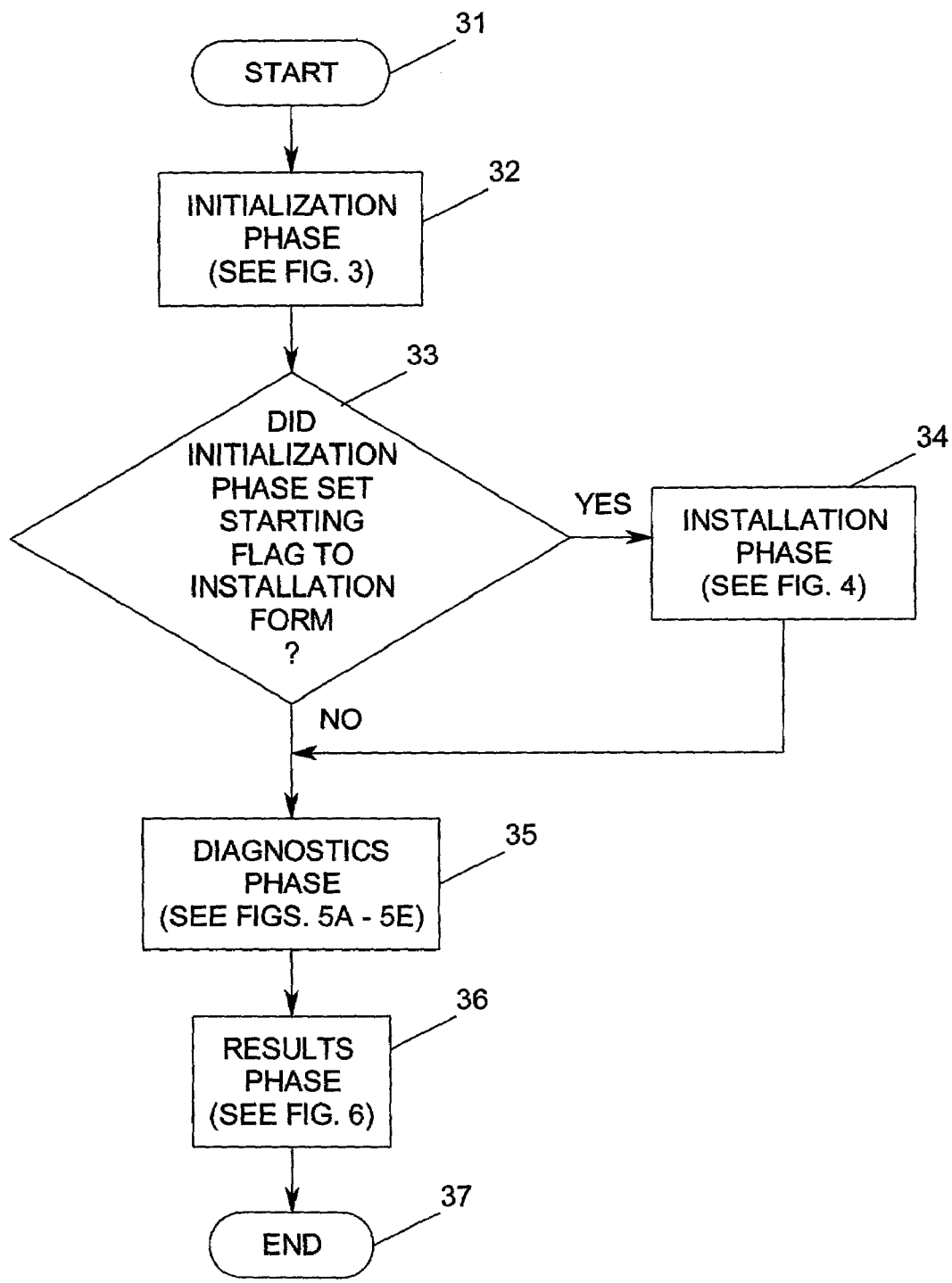
FIG. 2 is a flowchart that illustrates the different phases for the method of the present invention.
Figure 3:
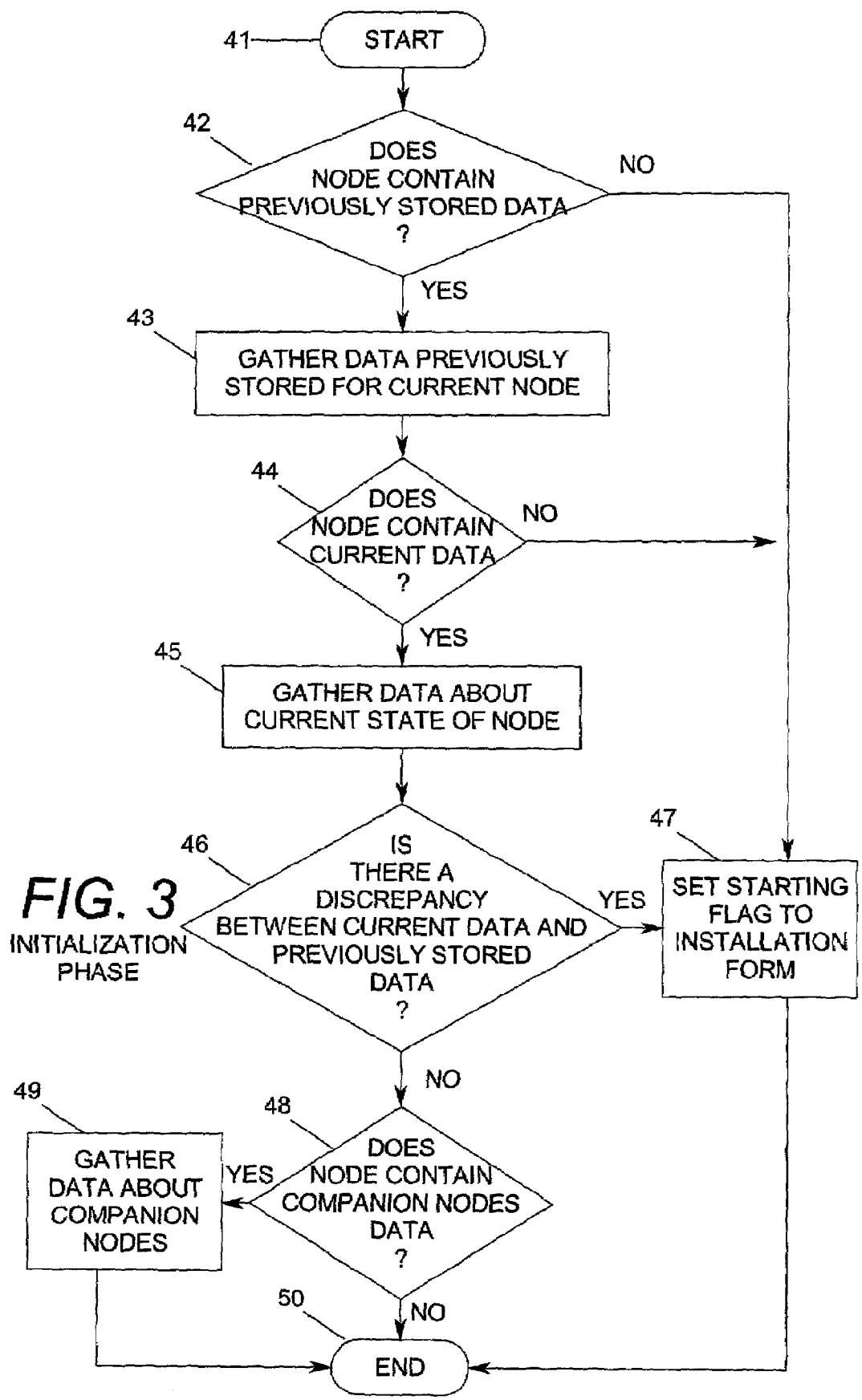
FIG. 3 is a flowchart illustrating the steps for the initialization phase.

With reference to FIG. 2, a flowchart illustrating the different phases performed to diagnose the cluster is shown. The process begins with start bubble 31 followed by a process step (block 32) to carry out the initialization phase. The process continues with an inquiry as to whether or not the initialization phase (See FIG. 3) set a starting flag to the installation form (diamond 33). If the answer to this inquiry is yes, the installation phase is carried out (block 34), as indicated in FIG. 3. If the answer to this step 33 inquiry is no, the installation phase is not carried out (see FIG. 4). The process continues with a process step (block 35) to carry out the diagnostics phase, as indicated in FIGS. 5A, 5B, 5C, 5D, 5E. After the diagnostics phase, the process continues by carrying out the results phase (block 36) shown in FIG. 2. The process then ends (bubble 37).

Referring now to FIG. 3, a flowchart illustrating the steps for the initialization phase is shown. The process begins with a start bubble 41 followed by an inquiry as to whether or not the node contains previously stored data (diamond 42). The node in this step is the current node. If the answer to this inquiry is no, the process sets a starting flag to the installation form (block 47) and exits at (bubble 50). Otherwise, on YES at Step 42, the process continues by gathering data (at step 43) previously stored for the current node (block 43). After gathering this data, the process continues with an inquiry as to whether or not the node contains current data (diamond 44). If the answer to this inquiry is no, the process sets a starting flag to the installation form (block 47) and exits (bubble 50). If the answer to this inquiry at step 44 is yes, the process gathers data about the current state of the node (block 45). The process continues with an inquiry as to whether or not there is a discrepancy between the current data and the previously stored data (diamond 46). For example, if the IP Address for the cluster was saved as 192.59.200.18 and the currently derived IP Address was now 192.59.200.180, this would indicate a discrepancy between the two configurations. If the answer to this inquiry is yes, the process sets the starting flag to the installation form (block 47) and exits (bubble 50). Otherwise, the process at step 46 (NO) continues with an inquiry as to whether or not the node contains companion node data (diamond 48). A companion node is another node known within the cluster distinct from the current node. If the answer to this inquiry is yes, the process gathers data about the companion nodes (block 49) and exits (bubble 50). If the answer to this inquiry is no, the process ends (bubble 50).

Figure 4:
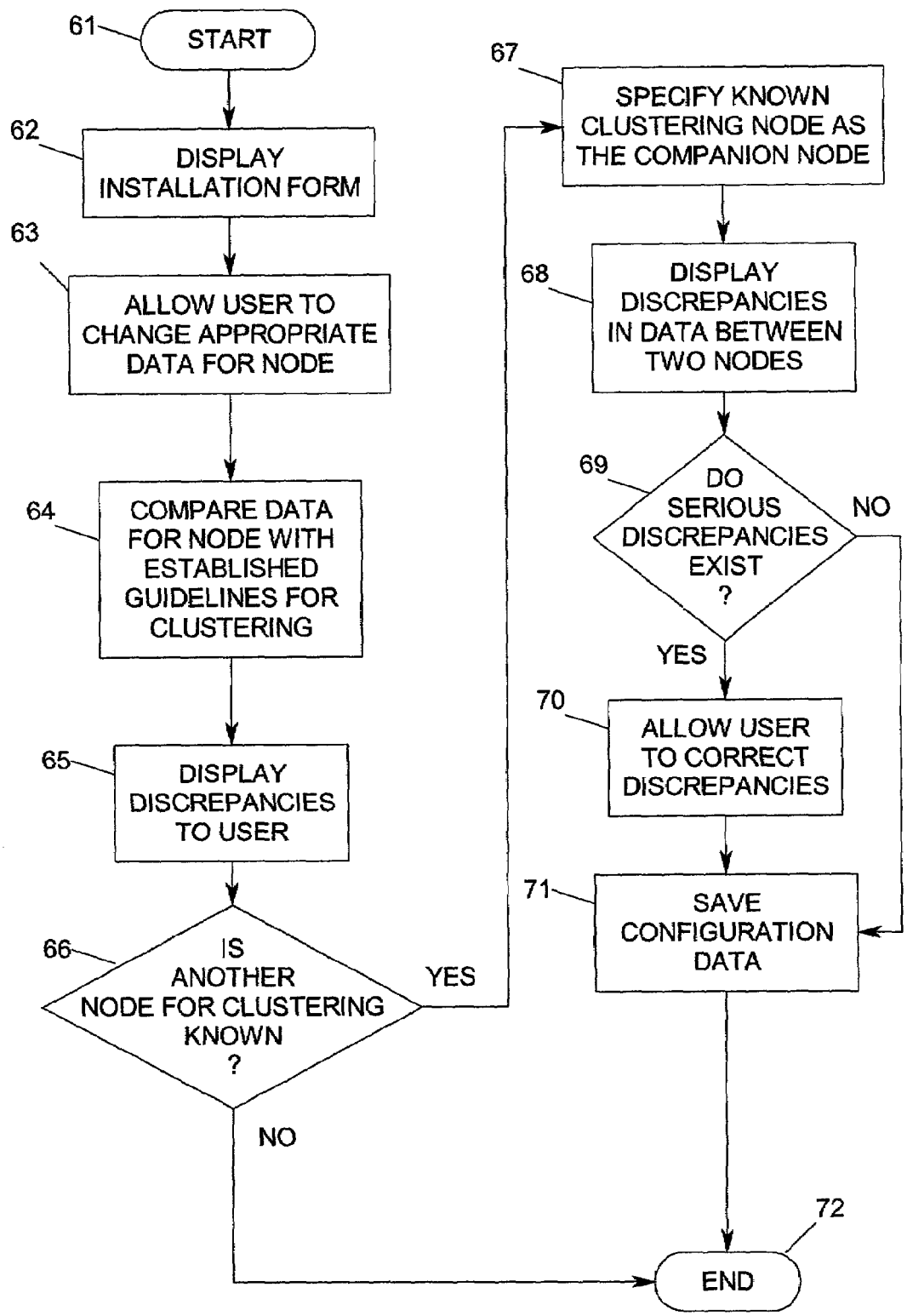
FIG. 4 is a flowchart that illustrates the steps for the installation phase.

With reference to FIG. 4, a flowchart that illustrates the steps for the installation phase is shown. The process begins with start bubble 61 followed by a process step (block 62) to display the installation form. The installation form allows the user to input information that cannot be derived directly from the node. Data for the node, both derived and manually input, appears on categorized tabs for clarity. The process continues with a process step (block 63) to allow the user to change appropriate data for the node. For instance the user could set the IP Address for the cluster. Next, the process compares the data, including the information for operation of the node, network communications, and shared disk storage, for the node as defined on the form with the established guidelines, such as those found in the Microsoft Cluster Support Knowledge Base for use with NSCS, for clustering this node (block 64). After comparing, the process reports any discrepancies to the user (block 65). The process continues with an inquiry as to whether or not another node for the cluster is known (diamond 66). If the answer to this inquiry is no, the process ends (bubble 72). If the answer to this inquiry is yes, the process specifies the other node as the companion node for determining the ability of the two nodes to form a cluster (block 67). Next, the process displays any discrepancies in data, such as a difference in the IP address for the cluster, to the user (block 68). This is followed by an inquiry as to whether or not serious discrepancies (such as the IP addresses used to communicate between the two nodes being on different subnets) exist between the two nodes (diamond 69). If the answer to this inquiry is yes, the process allows the user to correct discrepancies (block 70). If the answer to this inquiry is no, the process does not allow for the correction of discrepancies. The process continues with a process step (block 71) to save configuration data. The configuration data will contain a set of categories dealing with the configuration of the cluster. Each category will contain specific data items related to the category along with the value defined for the aspect. For instance, the Cluster category will have a data item for the IP Address for the cluster and will have a value such as 192.59.200.18. The process then ends (bubble 72).

FIG. 5 is a flowchart illustrating the general steps for the diagnostics phase. FIG. 5 is comprised of FIGS. 5A, 5B, 5C, 5D, and 5E.

Figure 5A:
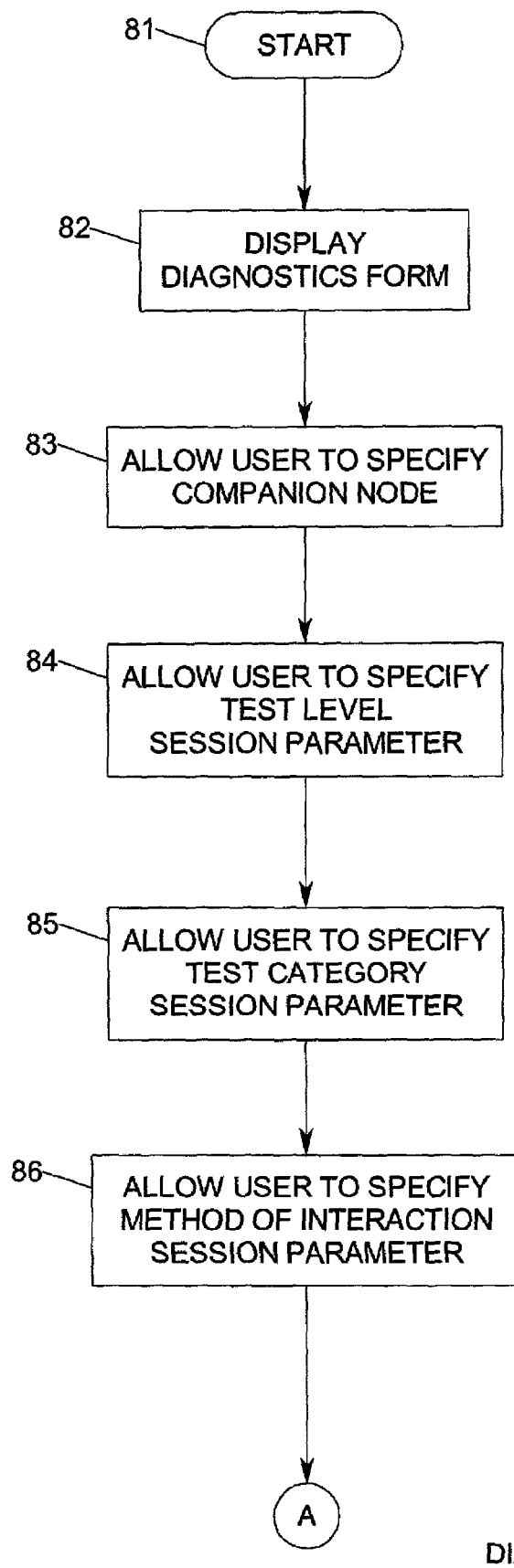
FIGS. 5A, 5B, 5C, 5D, and 5E combined form a flowchart illustrating the steps for the diagnostics phase.

Referring now to FIG. 5A, the diagnostics phase begins with start bubble 81 and continues with a process step (block 82) of displaying the diagnostics form. The diagnostics form will specify and control the level, type, and execution of the diagnostics to perform Next, the process allows the user to specify (from a list of nodes known to the cluster) a companion node, a node distinct from the current node that the cluster uses, for determining the ability of the nodes to act as a cluster (block 83). This companion node will hold for the diagnostics tests during the current execution of the program until re-specified. The process continues with a process step (block 84) to allow the user to set the test level for the diagnostics used during the session. The test level can be set to one of two levels, A non-obtrusive test disallows any diagnostics that will compromise the execution of the node. The complete test level allows any diagnostic to be used. After the test level is set using option buttons, the process allows the user to specify the test categories also found on the diagnostics form to use during the session (block 85). These categories contain a collection of related tests that the user may select. The process continues by allowing the user to set option buttons to indicate the method for interaction of the program with the user (block 86). Depending on the selection of the method for interaction, the process may either run all tests regardless of outcome, or stop when a test reports an error. The interaction process may also require the user to step between tests or allow the process to simply continue without user intervention. The interaction process also allows the user to specify the number of loops to make through the tests. The process then continues as described in FIG. 5B.

Figure 5B:
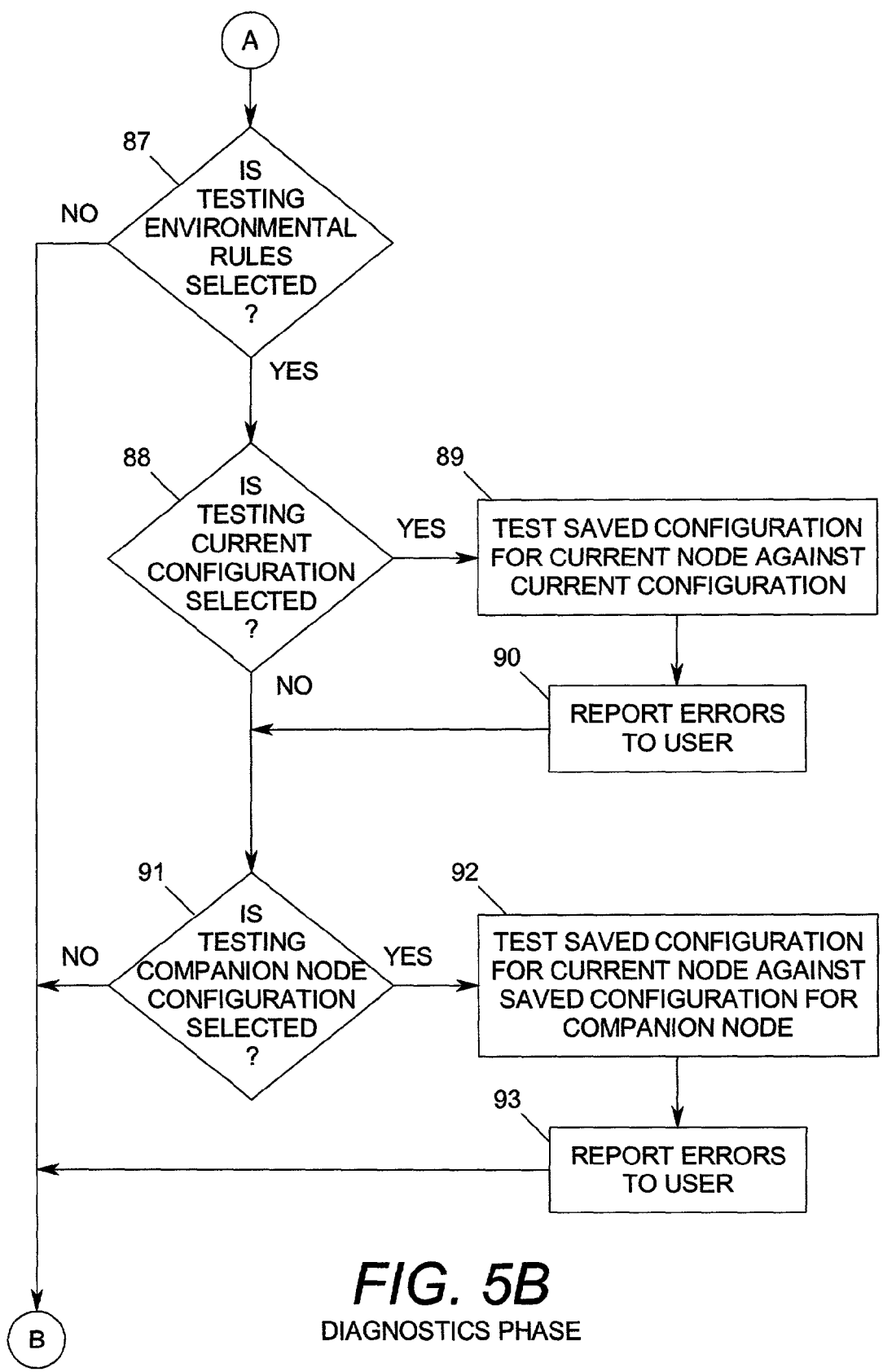

Referring now to FIG. 5B, the diagnostics phase process continues with the diagnostics operation and poses an inquiry as to whether or not testing environmental rules, (such as the current node or companion node configuration), is selected (diamond 87). If the answer to this inquiry is no, the process continues as described in FIG. 5C starting at reference marker B. Otherwise, the process step 87 (YES) continues with an inquiry as to whether or not testing the current configuration is selected (diamond 88). If the answer to this step 88 inquiry is yes, the process tests the saved configuration data for the current node against the current configuration (block 89), for example, the IP address for the cluster being 192.59.200.18 in the saved configuration and 192.59.200.180 in the current configuration, and reports any errors to the user (block 90). If the answer to this step 88 inquiry is no, the saved configuration data is not tested. Next, the step 91 process poses an inquiry as to whether or not testing the saved configuration for the current node against the saved configuration of the companion node is selected (diamond 91). If the answer to this inquiry is yes, the process continues with a process step (block 92) of testing the saved configuration of the current node against the saved configuration of the companion node to find any problems with the two nodes to act as a cluster. For instance the current node communicates on 192.59.201.17 while the companion node communicates on 192.59.200.16. The process then reports any errors to the user (block 93). The error would look similar to the following:

The two nodes are on different subnets:
Current Node: 192.59.201.17
Other Node 192.59.200.16

If the answer to the inquiry posed by diamond 91 is no, the process does not test the saved configuration. The process then continues as specified in FIG. 5C, starting at marker B.

Figure 5C:
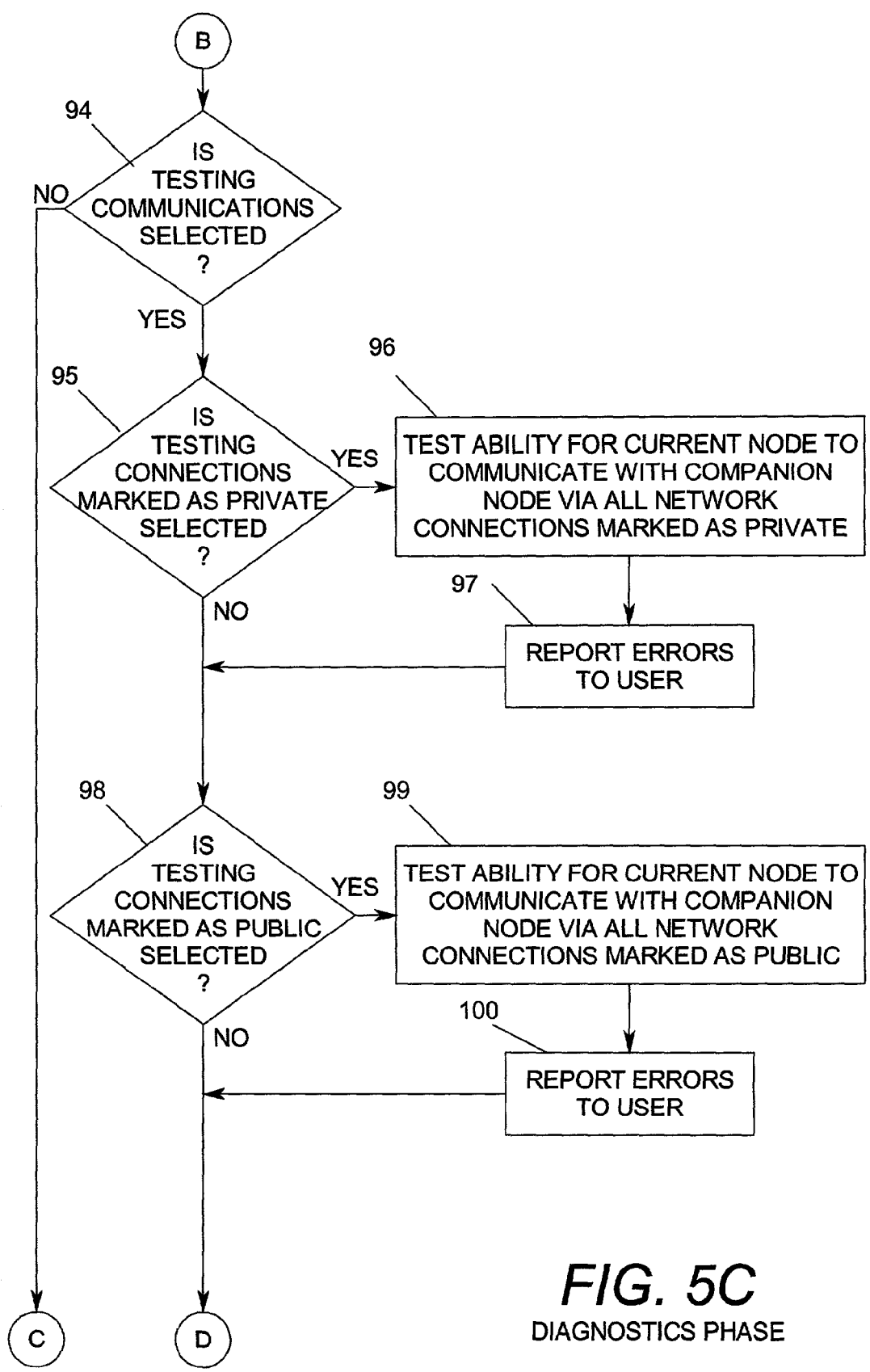

With reference to FIG. 5C, the Diagnostic Phase process continues with the diagnostics phase step 94 by inquiring whether or not the testing of communications is selected. These tests will diagnose physical problems communicating between the nodes within the cluster. If the answer to this inquiry is no, the process continues as described in FIG. 5E via markers C and E of FIG. 5D. Otherwise, at step 94 (YES) an inquiry is made as to whether or not testing of connections marked as private is selected (diamond step 95). The private communications pathway will be used for communications between nodes in a cluster to determine their accessibility. If the answer to this inquiry is yes, the process step 96 tests the ability for the current node to communicate with the companion node via all network connections marked as private (block 96). Such a connection performs only communications between the clustered nodes used to control the cluster. Any errors are reported to the user (block 97). If the answer to the inquiry posed by diamond step 95 is no, the process does not perform this test. The diagnostic process continues with an inquiry as to whether or not testing connections marked as public is selected (diamond 98). The public communications pathway will be used for communications between a node and other servers external to the cluster. If the answer to this step 98 inquiry is yes, the process tests the ability for the current node to communicate with the companion node via all network connections marked as public (block 99). Such a connection performs normal communications not associated with the operation of the cluster. The process then reports any errors to the user (block 100). If the answer to the inquiry posed by diamond step 98 is no, the process does not perform this test. The process then continues as described in FIG. 5D, via marker D.

Figure 5D:
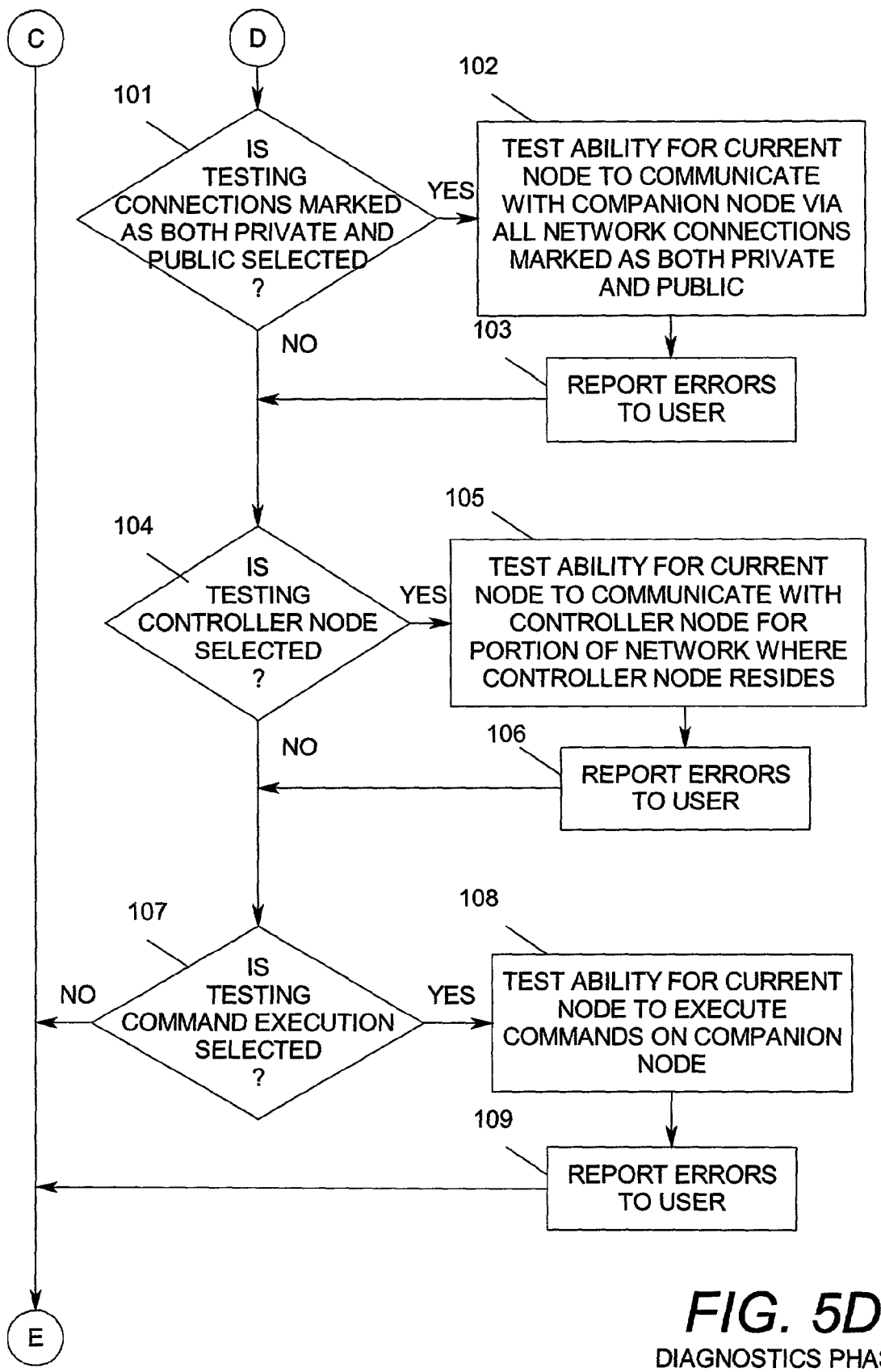

Referring now to FIG. 5D, the Diagnostic process continues with the diagnostics step 101 phase with an inquiry as to whether or not testing connections marked as both private and public are selected (diamond 101). If the answer to this inquiry is yes, the process step 102 tests the ability for the current node to communicate with the companion node via all network connections marked as both private and public (block 102). Such a connection performs both the communications between the clustered nodes used to control the cluster and the normal communications not associated with the operation of the cluster. Any errors are reported to the user (block 103). If the answer to the inquiry in diamond step 101 is no, the process does not perform this test.

Next, the diagnostic process poses an inquiry (diamond 104) as to whether or not testing the controller node is selected. A controller node is separate from the current and companion nodes, allowing the cluster to be visible to nodes outside of the cluster. If the answer to this step 104 inquiry is yes, the process tests the ability for the current node to communicate with the controller node for the domain or logical portion of the network where the node resides (block 105). Such a connection allows the cluster 16, FIG. 1, to be visible to the clients 11 and 12, FIG. 1 outside of the cluster. The diagnostic process then reports any errors to the users (11 and 16 of FIG. 1 (block 106). If the answer to the inquiry posed by diamond 104 is no, the process does not perform this test.

Next, an inquiry is made at step 107 as to whether or not the testing of command execution is selected. Command execution allows the current node to initiate commands on the companion node. If the answer to this inquiry is yes, the process tests the ability of the current node to execute commands on the companion node (block 108). Such a connection will allow the operation of the clustering software (17 and 20 of FIG. 1) to be effective. Any errors are reported to the user (block 109). If the answer to the inquiry in diamond 107 is no, the process does not perform this test. The process then continues as specified in FIG. 5E via the marker E.

Figure 5E:
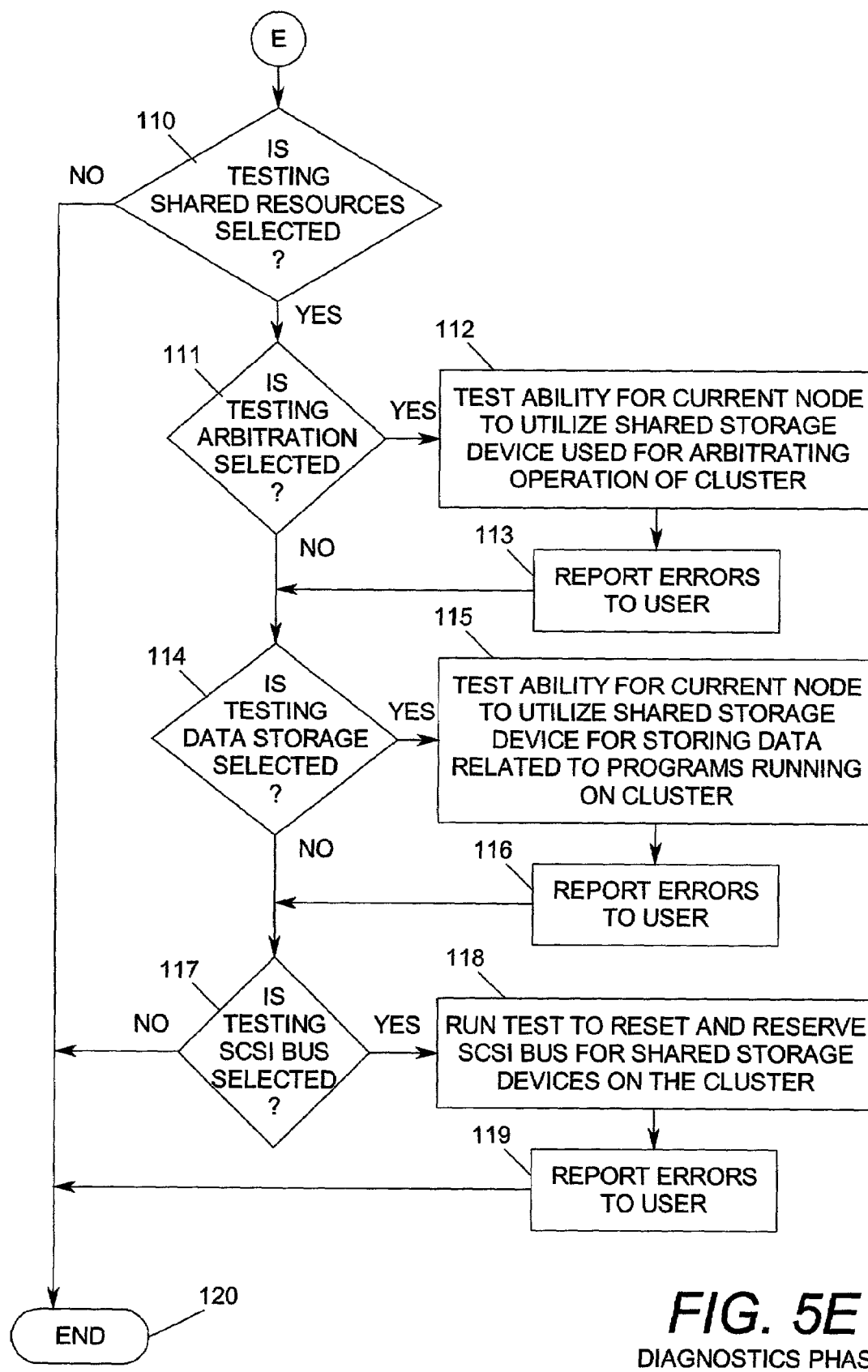

Referring now to FIG. 5E, the diagnostic process continues with the diagnostics step 110 phase by inquiring whether or not testing shared resources is selected (diamond 110). If the answer to this inquiry is no, the diagnostic process then ends (bubble 120). If the answer to this step 110 inquiry is yes, the diagnostic process continues with an inquiry (diamond 111) as to whether or not testing arbitration is selected. If the answer to this inquiry is yes, the diagnostic step 112 process tests the ability for the current node to utilize the shared storage device used for arbitrating the operation of the cluster (block 112). This arbitration mechanism allows the cluster to determine what node actually is in charge of the cluster. The diagnostic process then reports any errors to the users (11 and 12) (block 113). If the answer to the inquiry in diamond 111 is no, the diagnostic process does not perform this test. The diagnostic process continues with an inquiry as to whether or not the testing of data storage unit 15, FIG. 1. is selected (diamond 114). If the answer to this inquiry is yes, the diagnostic process tests the ability for the current node to utilize the shared storage device used for storing data related to the programs running on the cluster (block 115). Any errors are reported to the user (11 or 12, FIG. 1) (block 116). If the answer to the inquiry posed by diamond 114 is no, the sequence does not perform this test.

Next, the diagnostic inquires as to whether or not testing the SCSI bus (23, FIG. 1) is selected (diamond 117). If the answer to this step 117 inquiry is yes, the process runs the test to reset and reserve the SCSI bus for the shared storage devices on the cluster (block 118). The process reports any errors to the user 11 or 12, FIG. 1 (block 119). If the answer to the inquiry in diamond 117 is no, the diagnostic process does not perform this test. The process then ends (bubble 120).

Figure 6:
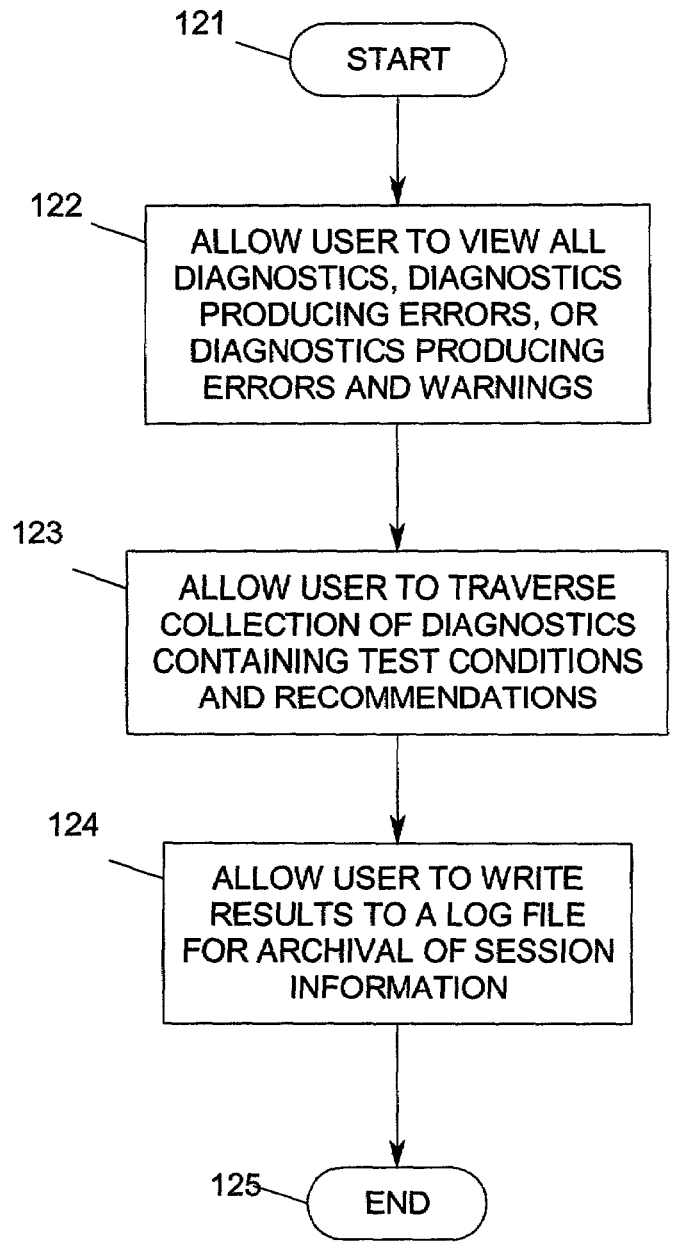
FIG. 6 is a flowchart that illustrates the steps for the results phase.

With reference to FIG. 6, a flowchart illustrating the steps for the results phase is shown. The process begins with start bubble 121 followed by a process step (block 122) to allow the user (11, 12) to view either all of the diagnostics for the session, or only those diagnostics producing errors, or those diagnostics producing either errors or warnings. Next, the results process allows the user to scan the collection of diagnostics (block 123). Each diagnostic contains a collection of one or more messages describing the condition encountered during the test, such as the following:

The Public Network connections for the nodes are on different subnets,

Each message may contain more detailed information about the results, such as the following:

The Public Network connections for the nodes are on different subnets,
Current Node 192.59.201.17
Other Node 192.59.200.16

Each message requiring attention by the user will have one or more recommendations for modifying the appropriate portion of the system. For example, Modify the IP address for the Public Connection on either this node or the other node so that the subnets for both are the same. Do this through the Network and Dialup Connections Wizard.

The process continues with a process step (block 124) to allow the user to write results to a log file for archival of session information. The process then ends (bubble 125).

Described herein has been a method for re-constituting a multiple mode server system cluster after a cluster failure has occurred. The re-establishment of the clustered server system is enabled by a series of method steps utilizing an initialization phase, an installation phase, a diagnostics phase, and a results phase which indicates to the user how the failure can be corrected to re-establish the server cluster into proper operation.

There has been shown and described a preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

The invention claimed is:

1. In a computer system including at least two server nodes, each of which can execute clustered server software, a method for providing data to restore clustering, said method comprising the steps of:
   (a) comparing a current configuration data to a previous configuration data in an initialization phase which includes the steps of:
      (a1) gathering previously stored data for a first one of said server nodes, and setting a flag to start with an installation phase if said previously stored data does not exist;
      (a2) gathering current state data for said first server node;
      (a3) comparing said current state data to said previously stored data, and setting said flag to start with said installation phase if discrepancies exist;
      (a4) gathering companion node data for said first server node;
      (a5) determining if said flag has been seen to start with an installation form, said installation form to permit a user to specify data to use in installing clustering software, and if so;
      (a6) displaying said installation form;
   (b) comparing said current configuration data to a standard configuration data in an installation phase which includes the steps of:
      (b1) allowing a user to change said current state data;
      (b2) comparing said current state data with established guidelines for clustering and reporting discrepancies to said user;
      (b3) determining if a second one of said server nodes is known by a first server node, and if so;
      (b4) specifying said second server node as a companion node;
      (b5) comparing configuration data of first server node with configuration data of said second server node;
      (b6) allowing said user to make corrections to said configuration data of first server node and said configuration data of second server node if discrepancies exist;
      (b7) saving said configuration data of first server node and said configuration data of second server node;
      (b8) displaying a diagnostics form;
   (c) comparing a set of operations to a standard clustering functionality in a diagnostics phase;
   (d) displaying a set of results in a results phase.

2. The method as in claim 1 wherein said data to restore clustering is provided when clustering services fail.

3. The method as in claim 1 wherein said installation phase further includes the step of installing clustered software on said computer system.

4. The method as in claim 1 wherein said diagnostics phase includes the steps of:
   (a) allowing a user to specify a companion node;
   (b) allowing a user to specify a diagnostics test level;
   (c) allowing a user to specify a set of test categories;
   (d) allowing a user to specify a method of interaction between said computer system and said user;
   (e) sequentially running a set of tests;
   (f) running a set of tests for environmental rules if selected;
   (g) running a set of tests for cluster communication if selected;
   (h) running a set of tests for shared resources if selected;
   (i) displaying a results form.

5. The method as in claim 4 wherein said step (f) of running said set of tests for environmental rules includes the steps of:
(f1) testing saved configuration data between a first server node and said configuration data of said first server node;
(f2) testing saved configuration data between said first server node and said configuration data of a second server Node.

6. The method as in claim 4 wherein said step (g) of running said set of tests for cluster communication includes the steps of:
(g1) testing an ability for a first server node to communicate with a second server node via all network connections marked as private;
(g2) testing an ability for a first server node to communicate with a second server node via all network connections marked as public;
(g3) testing an ability for a first server node to communicate with a second server node via all network connections marked as both private and public;
(g4) testing an ability for a first server node to communicate with a controller node;
(g5) testing an ability for a first server node to execute commands on said second server node.

7. The method as in claim 4 wherein said step (h) of running said set of tests for shared resources includes the steps of:
(h1) testing an ability for a first server node to utilize a shared storage device for arbitrating operation of said computer system;
(h2) testing an ability to reset and reserve a SCSI bus for said shared storage device.

8. The method as in claim 1 wherein said results phase includes the steps of:
(d1) allowing a user to view all diagnostics;
(d2) allowing a user to view diagnostics producing errors;
(d3) allowing a user to view diagnostics producing errors or warnings;
(d4) allowing a user to traverse a collection of diagnostics;
(d5) allowing a user to save said collection of diagnostics to a log file.

9. A Computer Readable Media encoded with machine-readable computer program code utilizing a method for providing data to restore clustering between a first server node and a second server node, wherein, when a computer system executes the computer program code, the computer performs the steps of:
(a) comparing a current configuration data to previous configuration data in an initialization phase;
(b) comparing said current configuration data to a standard configuration data in an installation phase wherein said installation phase includes the steps of:
(b1) allowing a user to access and change current state data;
(b2) comparing said current state data with established guidelines for clustering and reporting discrepancies to said user;
(b3) determining if a second one of said server nodes is known by said first server node, and if so;
(b4) specifying said second server node as a companion node;
(b5) comparing configuration data of first server node with configuration data of said second server node;
(b6) allowing a user to make corrections to said configuration data of first server node and said configuration data of second server node if discrepancies exist;
(b7) saving said configuration data of said first server node and said configuration data of said second server node;
(b8) displaying a diagnostics form
(c) comparing a set of operations to a standard clustering functionality in a diagnostics phase wherein said diagnostics phase includes the steps of:
(c1) allowing a user to specify a companion node;
(c2) allowing a user to specify a diagnostics test level;
(c3) allowing a user to specify a set of test categories;
(c4) allowing a user to specify a method of interaction between said computer system and a user;
(c5) sequentially running a set of tests;
(c6) running a set of tests for environmental rules if selected;
(c7) running a set of tests for cluster communication if selected;
(c8) running a set of tests for shared resources if selected;
(c9) displaying a results form
(d) displaying a set of results in a results phase.

10. The method as in claim 9 wherein said step (c6) of running said set of tests for environmental rules includes the steps of:
(c6a) testing a saved configuration between said first server node and said configuration data of said first server node;
(c6b) testing a saved configuration between said first server node and said configuration data of said second server node.

11. The method as in claim 9 wherein said step (c7) of running said set of tests for cluster communication includes the steps of:
(c7a) testing an ability for said first server node to communicate with said second server node via all network connections marked as private;
(c7b) testing an ability for said first server node to communicate with said second server node via all network connections marked as public;
(c7c) testing an ability for said first server node to communicate with said second server node via all network connections marked as both private and public;
(c7d) testing an ability for said first server node to communicate with a controller node;
(c7e) testing an ability for said first server node to execute commands on said second server node.

12. The method as in claim 9 wherein said step (c8) of running said set of tests for shared resources includes the steps of:
(c8a) testing for an ability for said first server node to utilize a shared storage device for arbitrating operation of said computer system;
(c8b) testing for an ability to reset and reserve a SCSI bus for said shared storage device.

13. The method as in claim 9 wherein step (d) of displaying said results phase includes the steps of:
(d1) allowing a user to view all diagnostics;
(d2) allowing a user to view diagnostics producing errors;
(d3) allowing a user to view diagnostics producing errors or warnings;
(d4) allowing a user to traverse a collection of diagnostics;
(d5) allowing a user to save said collection of diagnostics to a log file.

* * * * *